United States Patent
George et al.

(10) Patent No.: US 8,363,543 B2
(45) Date of Patent: Jan. 29, 2013

(54) MANAGEMENT OF NETWORK CAPACITY TO MITIGATE DEGRADATION OF NETWORK SERVICES DURING MAINTENANCE

(75) Inventors: Sanjini George, Edison, NJ (US); James Gordon Beattie, Bergenfield, NJ (US); Stephen J. Griesmer, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 501 days.

(21) Appl. No.: 12/624,947

(22) Filed: Nov. 24, 2009

(65) Prior Publication Data

US 2011/0122768 A1     May 26, 2011

(51) Int. Cl.
  *H04L 12/26* (2006.01)
(52) U.S. Cl. .................... 370/225; 370/252; 370/254
(58) Field of Classification Search .............. 370/225, 370/252, 254
  See application file for complete search history.

(56) References Cited

U.S. PATENT DOCUMENTS

| | | | |
|---|---|---|---|
| 8,018,860 B1 * | 9/2011 | Cook | 370/244 |
| 2004/0122645 A1 * | 6/2004 | Shevenell et al. | 703/21 |
| 2006/0140125 A1 * | 6/2006 | Ottinger et al. | 370/241 |
| 2009/0099827 A1 * | 4/2009 | Georgis et al. | 703/13 |

* cited by examiner

*Primary Examiner* — Jason Mattis
(74) *Attorney, Agent, or Firm* — Hoffman & Baron, LLP

(57) ABSTRACT

In accordance with a method of managing network capacity, simulation data is received from a simulation system based on at least one metric associated with a plurality of communication links interconnecting at least two endpoints. The simulation data indicates impact of a communication link to be taken offline a plurality of alternate communication links. It is determined whether the simulation data associated with at least one communication link satisfies at least one predetermined criterion. Further, at least one metric of the simulation system is periodically updated based on real-time data associated with the plurality of communication links. The simulation data from the simulation system based on the updated at least one metric is received. Thereafter, load from the communication link to be taken offline is selectively moved to an alternate communication link based on whether the simulation data associated with the alternate communication link satisfies the at least one predetermined criterion.

20 Claims, 3 Drawing Sheets

MANAGEMENT OF NETWORK CAPACITY TO MITIGATE DEGRADATION OF NETWORK SERVICES DURING MAINTENANCE

BACKGROUND

1. Field of Technology

The present application relates generally to computer networks. More specifically, the present application is directed to management of network capacity to mitigate degradation of network services during maintenance.

2. Brief Description of Related Art

A network generally includes a plurality of network elements that are interconnected by physical link segments forming one or more links to facilitate transmission of data between endpoints via at least one of the links of the network.

Often, network operations personnel need to evaluate the impact of certain changes to the network before the network changes are implemented in order to mitigate possible degradation of services via the network. For example, there are times when one or more network elements or physical link segments of a link require maintenance. During such maintenance, the link is taken offline and invariably reduces the available bandwidth between the endpoints to those online links that interconnect the endpoints.

A traffic outage simulator exists to help operations personnel in analyzing the impact of taking a particular link between two endpoints offline. While the traffic outage simulator forecasts the impact from the reduction of bandwidth as a result of the link being taken offline, the simulator does not account for the impact of real-time outages and degradation of services on the remaining links.

SUMMARY

In accordance with an embodiment, a method of adaptively managing network capacity is disclosed. In accordance with the method, simulation data is received from a simulation system based at least one metric associated with each of a plurality of communication links interconnecting at least two endpoints. The simulation data indicates impact of a communication link to be taken offline on the alternate communication links.

It is determined whether the simulation data associated with at least one communication link satisfies at least one predetermined criterion. Further, at least one metric of the simulation system is periodically updated based on real-time data associated with the plurality of communication links. The simulation data from the simulation system based on the updated at least one metric is received. Thereafter, load from the communication link to be taken offline is selectively moved to an alternate communication link based on whether the simulation data associated with the alternate communication link satisfies the at least one predetermined criterion.

In accordance with another embodiment, a system to adaptively manage network capacity is disclosed. The system includes a real-time outage update device and a route adjustment device. The real-time outage update device is configured to receive simulation data from a simulation system based on at least one metric associated with each of a plurality of communication links interconnecting at least two endpoints. The simulation data indicates impact of a communication link to be taken offline on the alternate communication links.

The real-time outage update device is also configured to determine whether the simulation data associated with at least one communication link satisfies at least one predetermined criterion, and to periodically update the at least one metric of the simulation system based on real-time data associated with the plurality of communication links. The real-time outage update device is further configured to receive simulation data from the simulation system based on the updated at least one metric. The route adjustment device is configured to selectively move load from the communication link to be taken offline to an alternate communication link based on whether the simulation data associated with the alternate communication link satisfies the at least one predetermined criterion.

In accordance with yet another embodiment, a machine-readable storage medium is disclosed. The machine-readable storage medium includes operational instructions that, when executed by a processor, cause the processor to receive simulation data from a simulation system based on at least one metric associated with each of a plurality of communication links interconnecting at least two endpoints. The simulation data indicates impact of a communication link to be taken offline on the alternate communication links. The machine-readable storage medium also includes operational instructions that, when executed by a processor, cause the processor to determine whether the simulation data associated with at least one communication link satisfies at least one predetermined criterion.

The machine-readable storage medium further includes operational instructions that, when executed by a processor, cause the processor to periodically update the at least one metric of the simulation system based on real-time data associated with the plurality of communication links. Additionally, the machine-readable storage medium includes operational instructions that, when executed by a processor, cause the processor to receive simulation data from the simulation system based on the updated at least one metric. The machine-readable storage medium further includes operational instructions that, when executed by a processor, cause the processor to selectively move load from the communication link to be taken offline to an alternate communication link based on whether the simulation data associated with the alternate communication link satisfies the at least one predetermined criterion.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which.

DETAILED DESCRIPTION

An example system and method of managing network capacity in order to mitigate degradation of network services during maintenance are disclosed herein. In the following description, for the purposes of explanation, numerous specific details are set forth in order to provide a thorough understanding of example embodiments. It will be evident, however, to one skilled in the art, that an example embodiment may be practiced without all of the disclosed specific details.

Figure 1:
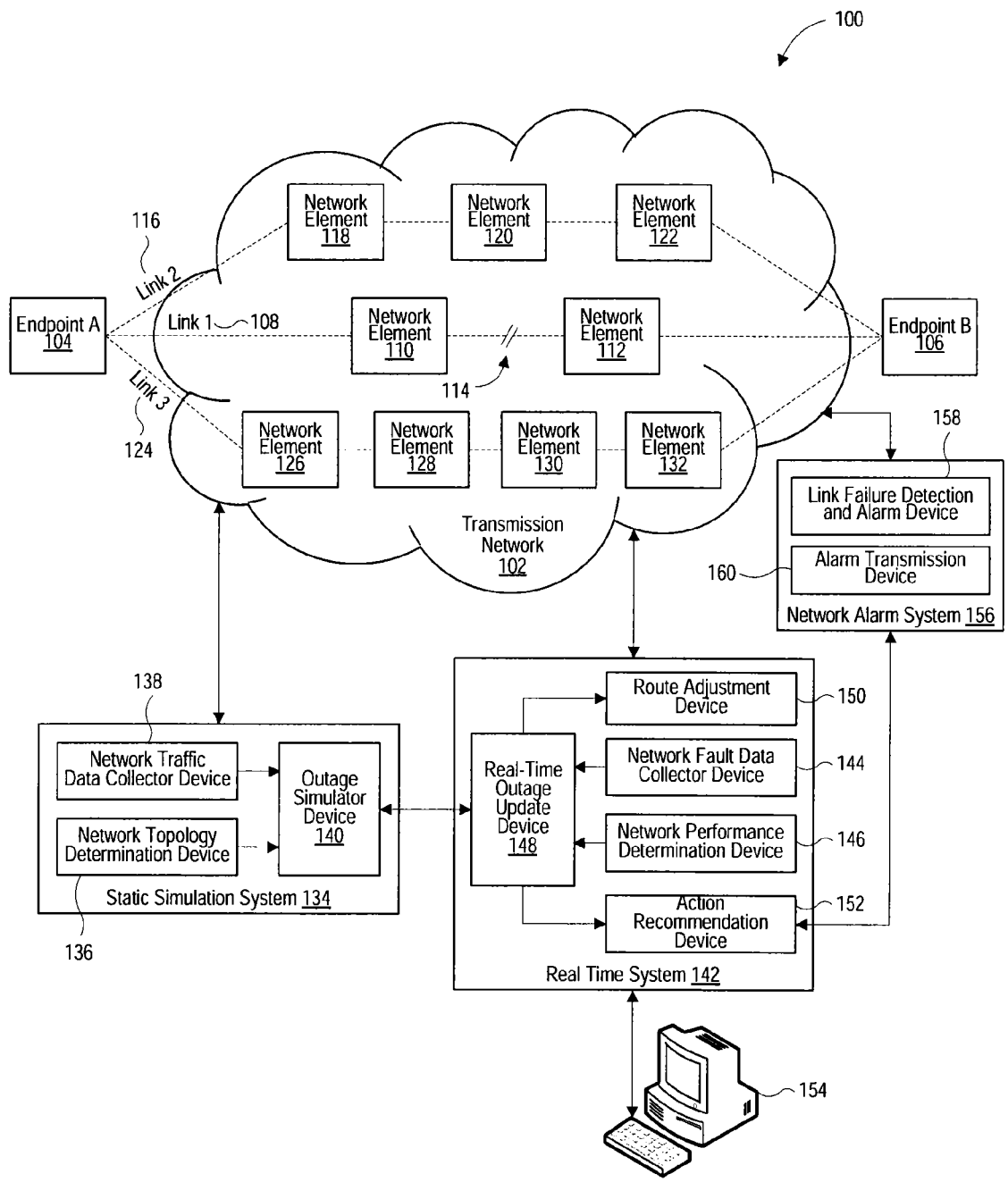
FIG. 1 illustrates a block diagram of an example adaptive system configured to mitigate degradation of network services during maintenance of the transmission network requiring a communication link to be taken offline.

FIG. 1 illustrates a block diagram of an example adaptive system 100 that is configured to mitigate degradation of network services during maintenance of the transmission network requiring a communication link to be taken offline. The example system 100 includes a transmission network 102, endpoint A 104 and endpoint B 106, static simulation system 134, real-time system 142, computing system 154, and network alarm system 156.

The transmission network 102 is configured to transmit telecommunication content (e.g., video, audio and audiovisual content) associated with telecommunication services (e.g., telephone, television and Internet services, as well as, other electronic services) provided by a telecommunication provider (not shown). The telecommunication content can be distributed over the transmission network 102 via Transfer Control Protocol/Internet Protocol (TCP/IP), any combination of conventional protocols or yet to be developed protocols.

The transmission network 102 can include one or more of a long haul transport network (e.g., a gigabit Ethernet network, an Asynchronous Transfer Mode (ATM) network, a frame relay network), a wireless network (e.g., a satellite network, a Wi-Fi network, LTE network, WiMAX network, or another wireless network), other public or private networks, or any combination thereof. The foregoing is not exhaustive and alternate or additional transmission networks can be employed in the transmission network 102.

The transmission network 102 includes a plurality of network elements 110-112, 118-122, 126-132, which interconnect the endpoints 104, 106 and are configured to facilitate transmission of telecommunication content between the endpoints 104, 106 via the transmission network 102. As an example, the network elements 110, 112 form a first communication link 108, network elements 118, 120, 122 form a second communication link 116, and network element 126, 128, 130, 132 form a third communication link 124. The network elements can include physical devices, such as routers, switches, bridges, hubs, and other physical devices, as well as, logical entities that unite one or more physical devices, such as a database and/or a signaling system, which may be used to transmit and route the telecommunication content.

One or more of the communication links 108, 116, 124 can be a border gateway protocol (BGP) route, interior gateway protocol (IGP) route, virtual private network (VPN) tunnel, or another link configured to facilitate transmission of telecommunication content between the endpoints 104, 106. The number of network elements and links are shown as examples. Both the number of network elements 110-112, 118-122, 126-132 and links 108, 116, 122 can vary based on design of the adaptive system 100. Further, one or more network elements of any link 108, 116, 124 can be disposed on one or more networks of the transmission network 102, as described above.

The endpoints 104, 106 are configured to at least transmit and receive telecommunication content over the transmission network 102. The endpoints 104, 106 can be further configured to display the telecommunication content. The endpoints 104, 106 can also be configured to raise alarms via the network alarm system 156 and further to provide performance data associated with network traffic they receive to the static simulation system 134 and the real-time system 142. An endpoint can be a server, host, client, peer, gateway or other device configured at least to transmit and receive telecommunication content over the transmission network 102. Although endpoints 104, 106 are shown for clarity and brevity, the number of endpoints can vary based on design of the adaptive system 100.

The endpoints 104, 106 can be connected to the transmission network 102 via fiber to the home (FTTH), fiber to the node (FTTN), telephone (e.g., digital subscriber line (DSL)), coaxial cable, hybrid fiber/coaxial, wireless or any other combination thereof. The foregoing is not exhaustive and alternate or additional connections can be employed.

The static simulation system 134 is configured to determine a topology of the transmission network 102 between endpoints 104, 106 and the capacity of traffic that can be transmitted over that topology, and further configured to evaluate the impact of taking offline a communication link between the endpoints 104, 106 (e.g., communication link 108) before the network changes are actually implemented in order to mitigate possible degradation of services via the communication network 102. The communication link 108 can be taken offline to maintain one or more network elements 110, 122 or a link segment 114 of the communication link 108. The static simulation system 134 includes a network topology determination device 136, a network traffic data collector device 138, and an outage simulator device 140.

The network topology determination device 136 is configured to determine the topology of the transmission network 102 between endpoints 104, 106. More specifically, the network topology determination device 136 can determine network element pairs, which make up each of the communication links 108, 116, 124 interconnecting the endpoints 104, 106. For example, network topology determination device 136 can determine that the first communication link 108 interconnecting endpoints 104, 106 includes one network element pair 110-112; the second communication link 116 interconnecting endpoints 104, 106 includes two network element pairs 118-120 and 120-122; and the third communication link 124 includes three network element pairs 126-128, 128-130 and 130-132. As stated earlier, the network element pairs are shows as an example. Depending on the design of the transmission network 102 design, different topologies can be used.

The network traffic data collector device 138 is configured to collect static traffic data (e.g., load) associated with the communication links 108, 116, 124 of the transmission network 102. The load represents a periodic snapshot of the behavior associated with communication links 108, 116, 124 using traffic data from the network element of the respective communication links 108, 116, 124, or a network element management system (not shown), which can be configured to manage the network elements of the respective communication links 108, 116, 124.

More specifically, for a communication link 108, 116, 124, the traffic data collector device 138 can collect aggregate bandwidth (e.g., amount of data in bits/second that can be transmitted via the communication link), aggregate latency (e.g., amount of time it takes a packet of data to travel between endpoints 104, 106 via the communication link), as well one or more additional metrics across that communication link 108, 116, 124. Other relevant aggregate metrics can be collected for a communication link, such a packet loss, jitter, or other performance metrics that may be available. For a network element pair of each communication link 108, 116, 124, the traffic data collector device 138 can further collect available bandwidth, latency, as well as well one or more additional metrics across that network element pair. Other relevant metrics can be collected for a network element pair, such a packet loss, jitter, or other performance metrics that may be available.

The outage simulator device 140 is configured to receive a communication link to be taken offline and to evaluate or simulate the impact thereof in the transmission network 102 before network changes are actually implemented, in order to mitigate possible degradation of services via the communication network 102. For example, the outage simulator device 140 can receive an indication of a communication link (e.g., communication link 108) to be taken offline from a computing system 154 via the real-time outage update simulation device 148, which will be described in greater detail below.

Using metrics (e.g., bandwidth, latency, as well as other metrics) collected by the network traffic data collection device 138 or the metrics updated by the real-time system 142, as will be described in greater detail below, the outage simulator device 140 can evaluate or simulate the impact of taking the received communication link (e.g., communication link 108) offline and moving the load of that communication link to an alternate communication link (e.g., communication links 116 or 124). The outage simulator device 140 provides an evaluation of how well traffic is flowing based on the period snapshot of traffic data. The evaluation produces a simulated output for each communication link, including an aggregate bandwidth and latency. The outage simulator device 140 transmits the simulated output to the real-time system 142.

The real-time system 142 is configured to periodically collect real-time data associated with communication links 108, 116, 122 of the transmission network 102. The real-time system 142 is further configured to update traffic data of communication links 108, 116, 124 collected by the network traffic data collector device 138 in accordance with the collected real-time data, and further to instruct the outage simulator device 140 to periodically re-evaluate the impact of taking communication link 108 offline based on the updated traffic data for the communication links 108, 116, 124, before actually taking a communication link 108 offline. Based on the re-evaluation, the real-time system 142 is further configured to adjust the transmission of the telecommunication content over the transmission network 102 based on the re-evaluation (e.g., move load of communication link 108 to communication link 116 or 122) and/or to provide one or more action recommendations associated with the transmission of the telecommunication content over the transmission network 102.

The real-time system 142 includes a network fault data collector device 144, network performance determination device 146, real-time outage update device 148, route adjustment device 150 and action recommendation device 152.

The network fault data collector device 144 is configured to collect fault data associated with at least one alternate communication link 116, 124 of the transmission network 102. For example, the network fault data collector device 144 can receive one or more network alarms from the network alarm system 156. The network alarms can indicate the failure of a communication link 116, 124 (e.g., fault data) associated with the transmission of telecommunication content over transmission network 102. For example, an alarm can indicate that the bandwidth or latency associated with any network element of a communication link has become critical. Additional alarms can indicate others failures of the communication links 116, 124.

The network performance determination device 146 is configured to check the health of the at least one alternate communication link 116, 124 that can carry traffic when communication link 108 is taken offline. The health check can include a current state of the network element pairs of communication link 116 and network element pairs of communication link 124. For example, the current state can include latency, packet loss, jitter and other metrics associated with the at least one alternate communication link 116, 124. The health check can also include a determination of whether there is planned maintenance of a network element or link segment of the alternate communication link about when the communication link 108 is to be taken offline. This determination can indicate whether there will be connectivity between network elements.

The real-time outage update device 148 is configured to receive an indication of a communication link to be taken offline (e.g., communication link 108) via computing system 154 and further configured to request the static simulation system 134 to generate a baseline evaluation of the impact of taking offline communication link 108 between the endpoints 104, 106 before network changes are actually implemented in order to mitigate possible degradation of services via the communication network 102.

The real-time outage update device 148 is also configured to periodically collect real-time data collected via network fault data collector device 144 and network performance determination device 146 and further to request the static simulation system 134 to generate an evaluation of the impact of taking offline communication link 108 between the endpoints 104, 106 in accordance with the collected real-time data. The real-time outage update device 148 can adaptively adjust the periodic collection and re-evaluation. For example, real-time data can be collected via real-time system 142 and impact of taking a communication link offline evaluated via static simulation system 134 on the basis of the real-time data at a first periodicity (e.g., weekly) when an interval from a current date/time to the planned date/time for taking offline the communication link 108 is equal to a first predetermined interval of time (e.g., interval>=a week).

As another example, real-time data can be collected and evaluation performed at a second periodicity (e.g., daily) when an interval from a current date/time to the planned date/time for taking offline the communication link 108 is equal to a second predetermined interval of time (e.g., week>interval>=day). As a further example, real-time data can be collected and evaluation performed at a third periodicity (e.g., hourly or less frequently) when an interval from a current date/time to the planned date/time for taking offline the communication link 108 is equal to a third predetermined interval of time (e.g., day>interval>=hour). Other periodicities and predetermined intervals of time can be defined for adaptive collection and re-evaluation. The periodicities and intervals of time can be provided via the computing system 154.

The real-time outage update device 148 is further configured to select an alternate communication link e.g., communication links 116 or 124) based on a determination that simulation output returned from the static simulation system 134 for that communication link satisfies at least one predetermined criterion, and to move the load of the communication link 108 to be taken offline to the alternate selected communication link (e.g., communication links 116 or 124) via route adjustment device 150, and/or to provide at least one recommended action via action recommendation device 152.

For example, the real-time outage update device 148 can receive simulation output from the static simulation system 134, and using data from the network fault data collector device 144 and the network performance determination device 146, can assemble instructions for the transmission network 102 via route adjustment device 150 and actions for the personnel via action recommendation device 152. The load of communication link 108 can be taken offline by the user via computing system 154 by inputting that request, seeing the assessment of the impact from the real-time system 142, and having the action recommendation device 152 update the network alarm system 156 with an indication that the load of communication link 108 may be taken offline and that the resulting alarms should be so considered.

Thereafter, the network alarm system 156 can update endpoints 104, 106 to increase the "cost" of the communication link 108. Increasing the "cost" of the communication link 108 to a level that makes it "unattractive" when compared to the cost of the alternate communication links 116, 124 enables the load to be moved to the alternate communication link 116, 124 the cost of which is lower. Alternate prioritization mechanisms can be employed to determine the alternate communication link to which the load should be moved.

The route adjustment device 150 is configured to receive an instruction from the real-time outage update device 148— after collection, evaluation and determination described above—which instructs the route adjustment device 150 to move load being transmitted over communication link 108 being taken offline to an alternate link (e.g., communication links 116 or 124). For example, specific paths or neighbors in the case of BGP or IGP routes, or VPN terminations in the case of VPN tunnels, can be updated to reflect lower (or higher) priority in their respective routing tables.

The action recommendation device 152 is configured to provide at least one recommended action via computing system 154 when at least one alternate communication link (e.g., communication links 116 or 124) does not satisfy at least one predetermined criterion. The possible recommended action can includes provision of more staff, raising an alarm, escalating or shortening alarm severity via the network alarm system 156. The recommendations can indicate whether primary or secondary communication link 116, 124 recommendations will meet the same quality of service (QoS) as communication link 108, and if not, can further indicate what might be the expected degradation of the QoS of the communication links 116, 124. Further, some prioritized escalation can be recommended and invoked as a way to highlight a need to closely monitor the degradation, should there be active issues with the remaining bandwidth of communication links 116, 124.

The computing system 154 is configured to receive and display data necessary to manage network capacity of network services during maintenance. For example, a graphical user interface can be provided to display to a user the topology (e.g., communication links 108, 116, 124) of the transmission network 102, to allow the user to select a communication link (e.g., communication links 108) to be taken offline for maintenance and to provide date/time of such maintenance.

The network alarm system 156 is configured to monitor the transmission network 102 and further configured to generate network alarms that indicate failure of communication link 108, 116, 124 associated with the transmission of telecommunication content over transmission network 102. More specifically, the network alarm system 156 includes a link failure detection and alarm device 158 and an alarm transmission device 160. The link failure detection and alarm module 158 is configured to monitor the network elements 110, 112, 118-122, 126-132 and the communication links 108, 116, 122 of the transmission network 102 and further configured to generate a network alarm that indicates failure of the availability of any communication link 108, 116, 122 for the transmission of telecommunication content via the transmission network 102. The alarm transmission device 160 is configured to transmit the alarm generated by the link failure detection and alarm device 158 to network fault data collector 144 of the real-time system 142.

Figure 2:
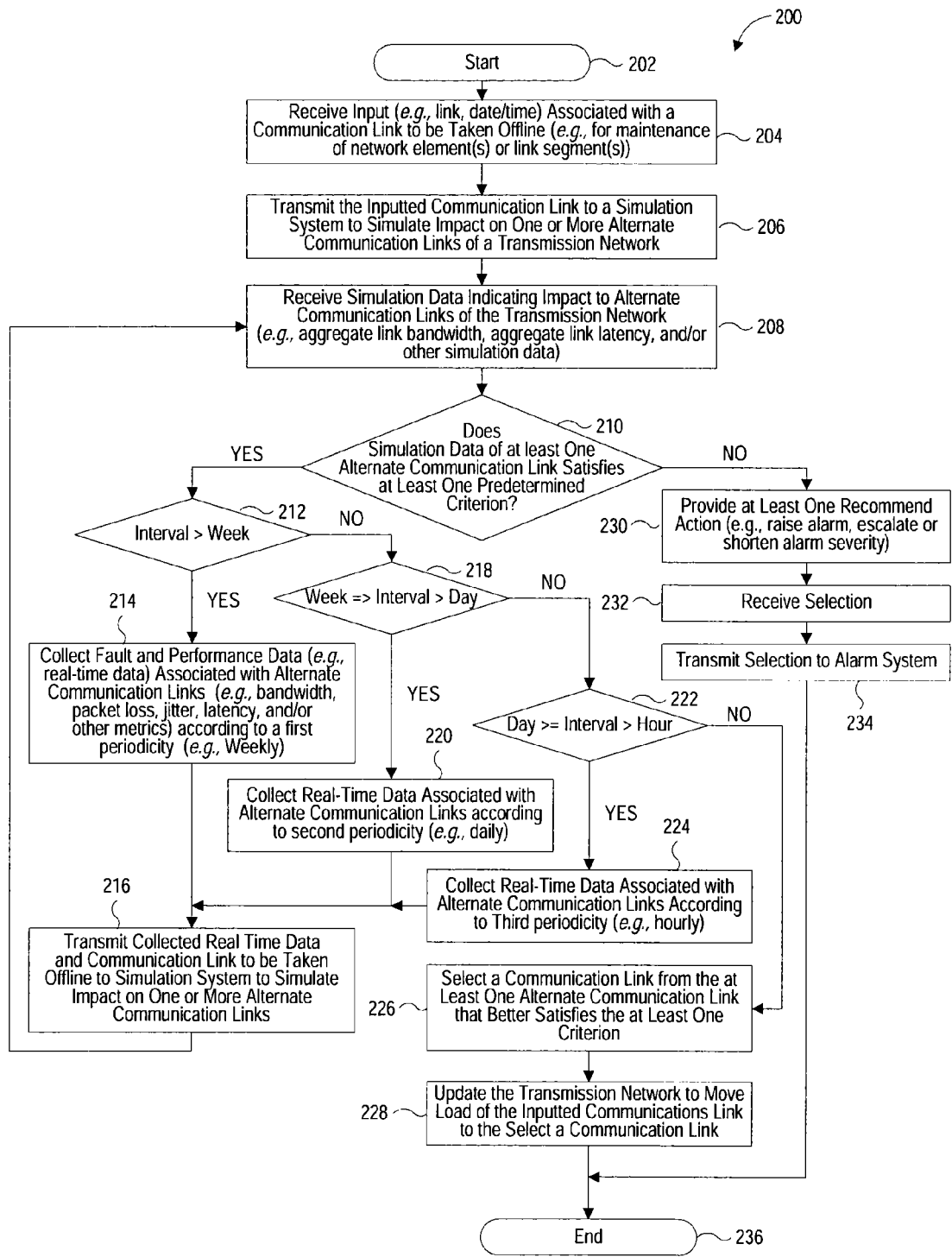
FIG. 2 illustrates a flowchart of an example method of managing network capacity adaptively to mitigate degradation of network services during maintenance of a transmission network in accordance with the adaptive system of FIG. 1.

FIG. 2 illustrates a flowchart of an example method 200 of managing network capacity adaptively to mitigate degradation of network services during maintenance of the transmission network 102 in accordance with the adaptive system 100 of FIG. 1. The method 200 starts at operation 202 in which the adaptive system 100 operates in a first operational state, as shown in FIG. 1. For example, telecommunication content is being transmitted via communication link 108 between endpoints 104, 106.

At operation 204, an input associated with a communication link to be taken offline is received. For example, the real-time system 142 can receive, via the computing system 154, an indication of a communication link 108 to be taken offline for maintenance (e.g., network element 110, link segment 114, and/or other elements or segments of the communication link 108) and a date/time for such offline maintenance. At operation 206, the inputted communication link is transmitted to a simulation system to simulate the impact of taking the imputed communication link offline on one or more alternate communication links of the transmission network 102. For example, the real-time system 142 can transmit the inputted communication link 108 to the simulation system 134. The simulation system 134 then simulates the impact of taking the inputted communication link 108 offline on the alternate communication links 116, 124 of the transmission network 102 interconnecting endpoints 104, 106.

At operation 208, simulation data indicating the impact to the alternate communication links is received. For example, the real-time system 142 receives simulation data from the simulation system 134 indicating the impact of taking communication link 108 offline on communication links 116, 124. At operation 210, a determination is made whether simulation data of at least one alternate communication link satisfies at least one predetermined criterion. For example, the real-time outage update device 148 can determine whether simulation data of at least one alternate communication link 116, 124 satisfies at least one predetermined criterion, such as for example, whether the aggregate bandwidth is greater than a predetermined bandwidth threshold, or aggregate latency is lower than a predetermined latency threshold, or another metric satisfies another predetermined criterion.

If at operation 210 it is determined that simulation data of at least one alternate communication link satisfies at least one predetermined criterion, then method 200 continues at operation 212. At operation 212, a determination is made whether an interval between a current date/time and date/time for taking the communication link offline is greater than a first time period. For example, the real-time outage update device 148 can determine whether the interval is greater than a week.

If it is determined that the interval is greater than the first time period at operation 212, the method 200 continues at operation 214 where real-time data associated with the alternate communication links is collected according to a first periodicity. For example, collection of real-time data can be performed weekly and can include the network fault data collector device 144 collecting fault data and the network performance determination device 146 determining performance data of the alternate communication links 116, 124.

At operation 216, the collected real-time data and the communication link to be taken offline are transmitted to the simulation system. For example, in one embodiment, the real-time outage update device 148 can transmit the collected real-time data and the communication link 108 to be taken offline to the simulation system 134, instructing the simulation system 134 to simulate impact by accounting for the real-time data for communication links 116, 124. In another embodiment, the real-time outage update device 148 can update the metrics of the simulation system 134 based on the real-time data and can further request the simulation system 134 to simulate the impact of taking communication link 108 offline on the alternate communication links 116, 124 according to the updated metrics. Thereafter, the method continues at operation 208 to receive the re-evaluated simulation data.

If it is determined that the interval is not greater than the first period of time at operation 212, the method 200 continues at operation 218 where a determination is made whether the interval for taking the communication link offline is within a second time period. For example, the real-time outage update device 148 can determine whether the interval is greater than a day but less than or equal to a week. If it is determined that the interval is within the second time period at operation 218, the method 200 continues at operation 220 where real-time data associated with the alternate communication links is collected according to a second periodicity. For example, collection of the real-time data can be performed daily.

If it is determined that the interval is not within the second time period at operation 218, the method 200 continues at operation 222 where a determination is made whether the interval for taking the communication link offline is within a third time period. For example, the real-time outage update device 148 can determine whether the interval is greater than an hour but less than or equal to a day. If it is determined that the interval is within the third time period at operation 222, the method 200 continues at operation 224 where real-time data associated with the alternate communication links is collected according to a third periodicity. For example, collection of the real-time data can be performed hourly.

If it is determined that the interval is not within the third time period at operation 222, the method 200 continues at operation 226 where a communication link is selected from the at least one alternate communication link that better satisfies the at least one criterion. For example, the real-time outage updated device 148 can select communication link 116 from communication links 116, 124 if such communication link satisfies the at least one criterion. At operation 228, the transmission network 102 is updated to take the inputted communication link offline by moving the load of that communication link to the selected communication link. For example, the route adjustment device 150 can move the load of communication link 108 to communication link 116 via costing or other prioritization. Thereafter the method ends at operation 236.

Now referring back to operation 210, if it is determined that the simulation data of at least one alternate communication link does not satisfy at least one predetermined criterion, then method 200 continues at operation 230 where at least one recommended action is provided. For example, the real-time outage updated device 148 can recommend to the user via computing system 154 to raise an alarm, escalate or shorten severity of an existing alarm of an alternate communication link via network alarm system 156. Addition recommended actions can include providing additional staff or operations personnel at computing system 154. At operation 232, a selection of a recommended action is received. For example, the real-time update device 148 can receive a selection from the user via the computing system 154. At operation 234, the received selection is transmitted to a network alarm system. For example, the real-time update device 148 transits the selected recommended action to the network alarm system 156, which raises an alarm, escalates or shortens severity of an existing alarm.

Figure 3:
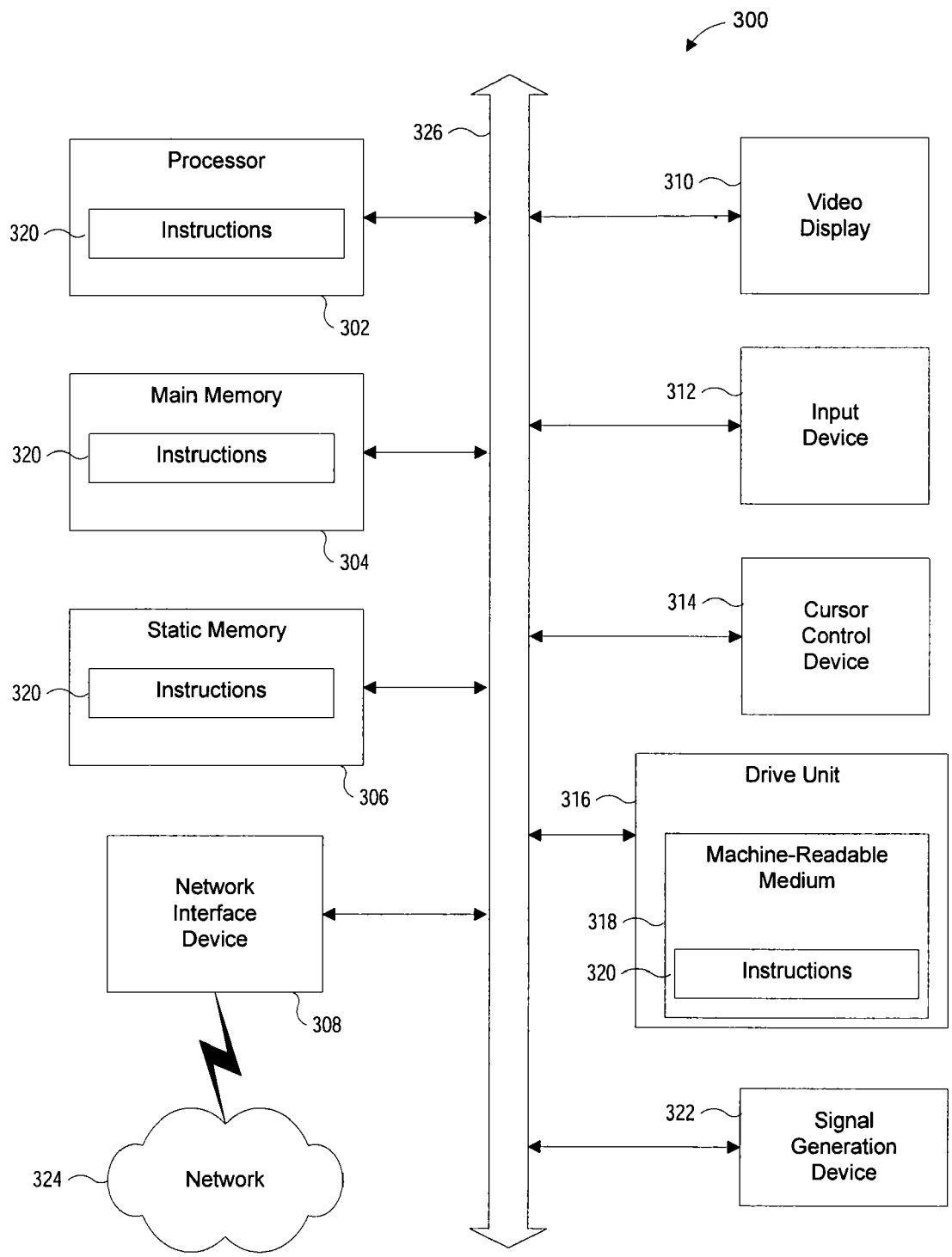
FIG. 3 is a block diagram of a general computer system.

FIG. 3 is a block diagram of a general computer system 300. The computer system 300 can include a set of instructions that can be executed to cause the computer system 300 to perform any one or more of the methods or computer based functions disclosed herein with respect to FIGS. 1-2. The computer system 300 or any portion thereof, may operate as a standalone device or may be connected, e.g., using a network 324, to other computer systems or devices disclosed herein with respect to FIGS. 1-2. For example, the computer system 300 can include or be included within any one or more of the systems, computers, network elements, endpoints, or any other devices disclosed herein with respect to FIGS. 1-2.

In a networked deployment, the computer system 300 may operate in the capacity of a server or a client machine in a server-client network environment, or a peer machine in a peer-to-peer (or distributed) network environment. The computer system 300 can also be implemented as or incorporated into various devices, such as a personal computer (PC), a tablet PC, a personal digital assistant (PDA), a web appliance, a communications device, a mobile device, a wireless telephone, a control system, a network router, switch or bridge, a portal, a database system, an endpoint, or any other machine capable of executing a set of instructions (sequential or otherwise) that specify actions to be taken by that machine. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 402, e.g., a central processing unit (CPU), a graphics-processing unit (GPU), or both. Moreover, the computer system 300 can include a main memory 404 and a static memory 406 that can communicate with each other via a bus 326. As shown, the computer system 400 may further include a video display unit 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. The computer system 300 can also include a disk drive unit 316, a signal generation device 322, such as a speaker or remote control, and a network interface device 308.

In a particular embodiment, as depicted in FIG. 3, the disk drive unit 316 may include a machine or computer-readable medium 318 in which one or more sets of instructions 320 (e.g., software) can be embedded. Further, the instructions 320 may embody one or more of the methods or logic as described herein with reference to FIGS. 1-2. In a particular embodiment, the instructions 320 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with the various embodiments, the methods described herein may be implemented by software programs that are tangibly embodied in a processor-readable medium and that may be executed by a processor. Further, in an example, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software which implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Thus, a system and method of managing network capacity in order to mitigate degradation of network services during maintenance have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A method of adaptively managing network capacity, the method comprising:

receiving simulation data from a simulation system based on a metric associated with each of a plurality of communication links interconnecting endpoints, the simulation data indicating impact of a communication link to be taken offline on a plurality of alternate communication links;

determining whether the simulation data associated with a communication link of the plurality of communication links satisfies a predetermined criterion;

periodically updating the metric based on real-time data associated with each of the plurality of communication links;

receiving simulation data from the simulation system based on the updated metric according to a periodicity selectively adjusted based on an interval of time between a current date and time and a date and time that the communication link is to be taken offline, the simulation data based on the updated metric indicating impact of the communication link to be taken offline on the plurality of alternate communication links; and selectively moving load from the communication link to be taken offline to an alternate communication link of the plurality of alternate communication links based on whether the simulation data associated with the alternate communication link satisfies the predetermined criterion.

2. The method of adaptively managing network capacity according to claim 1, further comprising receiving an indication of the communication link to be taken offline from a user.

3. The method of adaptively managing network capacity according to claim 2, further comprising:
transmitting the received indication of the communication link to be taken offline to the simulation system; and
requesting the simulation system to generate the simulation data based on the metric associated with each of the plurality of communication links interconnecting the endpoints.

4. The method of adaptively managing network capacity according to claim 1, further comprising periodically collecting real-time data associated with the plurality of communication links.

5. The method of adaptively managing network capacity according to claim 4, wherein periodically collecting real-time data associated with the plurality of communication links further comprises:
collecting network fault data associated with the plurality of communication links; and
determining performance data associated with the plurality of communication links.

6. The method of adaptively managing network capacity according to claim 1, further comprising periodically requesting the simulation system to generate the simulation data based on the updated metric.

7. The method of adaptively managing network capacity according to claim 6, wherein periodically requesting the simulation system to generate the simulation data based on the updated metric is performed according to the periodicity selectively adjusted based on the interval of time between the current date and time and the date and time that the communication link is to be taken offline.

8. A system to adaptively manage network capacity, the system comprising:
a real-time outage update device configured to:
receive simulation data from a simulation system based on a metric associated with each of a plurality of communication links interconnecting endpoints, the simulation data indicating impact of a communication link to be taken offline on a plurality of alternate communication links;
determine whether the simulation data associated with a communication link of the plurality of communication links satisfies a predetermined criterion;
periodically update the metric based on real-time data associated with the plurality of communication links; and
receive simulation data from the simulation system based on the updated metric according to a periodicity selectively adjusted based on an interval of time between a current date and time and a date and time that the communication link is to be taken offline, the simulation data based on the updated metric indicating impact of the communication link to be taken offline on the plurality of alternate communication links; and
a route adjustment device configured to selectively move load from the communication link to be taken offline to an alternate communication link of the plurality of communication links based on whether the simulation data associated with the alternate communication link satisfies the predetermined criterion.

9. The system to adaptively manage network capacity according to claim 8, further comprising a computing device configured to receive an indication of the communication link to be taken offline from a user.

10. The system to adaptively manage network capacity according to claim 9, wherein the real-time outage update device is further configured to:
transmit the received indication of the communication link to be taken offline to the simulation system; and
request the simulation system to generate the simulation data based on the metric associated with each of the plurality of communication links interconnecting the endpoints.

11. The system to adaptively manage network capacity according to claim 8, further comprising:
a network fault data collector device configured to collect network fault data associated with the plurality of communication links; and
a network performance determination device configured to determine performance data associated with the plurality of communication links.

12. The system to adaptively manage network capacity according to claim 8, wherein the real-time outage update device is further configured to periodically request the simulation system to generate the simulation data based on the updated metric.

13. The system to adaptively manage network capacity according to claim 12, wherein a periodic request is performed according to the periodicity selectively adjusted based on the interval of time between a current date and time and the date and time that the communication is link to be taken offline.

14. A non-transitory machine-readable storage medium comprising instructions that, when executed by a processor, cause the processor to:
receive simulation data from a simulation system based on a metric associated with each of a plurality of communication links interconnecting endpoints, the simulation data indicating impact of a communication link to be taken offline on a plurality of alternate communication links;

determine whether the simulation data associated with a communication link of the plurality of communication links satisfies a predetermined criterion;

periodically update the metric based on real-time data associated with the plurality of communication links;

receive simulation data from the simulation system based on the updated metric according to a periodicity selectively adjusted based on an interval of time between a current date and time and a date and time that the communication link is to be taken offline, the simulation data based on the updated metric indicating impact of the communication link to be taken offline on the plurality of alternate communication links; and selectively move load from the communication link to be taken offline to an alternate communication link of the plurality of alternate communication links based on whether the simulation data associated with the alternate communication link satisfies the predetermined criterion.

15. The non-transitory machine-readable storage medium according to claim 14, further comprising instructions that, when executed by the processor, cause the processor to receive an indication of the communication link to be taken offline from a user.

16. The non-transitory machine-readable storage medium according to claim 15, further comprising instructions that, when executed by the processor, cause the processor to:

transmit the received indication of the communication link to be taken offline to the simulation system; and request the simulation system to generate the simulation data based on the metric associated with each of the plurality of communication links interconnecting the endpoints.

17. The non-transitory machine-readable storage medium according to claim 14, further comprising instructions that, when executed by the processor, cause the processor to periodically collect real-time data associated with the plurality of communication links.

18. The non-transitory machine-readable storage medium according to claim 17, wherein instructions to periodically collect real-time data associated with the plurality of communication links further include instructions that, when executed by the processor, cause the processor to:

collect network fault data associated with the plurality of communication links; and determine performance data associated with the plurality of communication links.

19. The non-transitory machine-readable storage medium according to claim 18, further comprising instructions that, when executed by a processor, cause the processor to periodically request the simulation system to generate the simulation data based on the updated-metric.

20. The non-transitory machine-readable storage medium according to claim 19, wherein instructions to periodically request the simulation system to generate the simulation data based on the updated metric are performed according to the periodicity selectively adjusted based on the interval of time between the current date and time and the date and time that the communication link is to be taken offline.

* * * * *